(12) United States Patent
Farris et al.

(10) Patent No.: US 9,745,094 B2
(45) Date of Patent: Aug. 29, 2017

(54) METHOD AND APPARATUS FOR AUTOMATED OPENING AND DISPENSING OF SEED FROM A CONTAINER

(71) Applicant: DOW AGROSCIENCES LLC, Indianapolis, IN (US)

(72) Inventors: Jaxon Farris, Indianapolis, IN (US); Pradeep Setlur, Carmel, IN (US); Max O. Ruegger, Indianapolis, IN (US); J. Robert Peterson, Carmel, IN (US); Eric Frederickson, Indianapolis, IN (US); Dennis Fitzl, Jr., Ames, IA (US); Nathan Vanopdorp, Geneseo, IL (US); David Lewis, Fishers, IN (US)

(73) Assignee: Dow AgroSciences LLC, Indianapolis, IN (US)

( * ) Notice: Subject to any disclaimer, the term of this patent is extended or adjusted under 35 U.S.C. 154(b) by 78 days.

(21) Appl. No.: 14/962,501

(22) Filed: Dec. 8, 2015

(65) Prior Publication Data
US 2016/0185476 A1   Jun. 30, 2016

Related U.S. Application Data

(60) Provisional application No. 62/091,038, filed on Dec. 12, 2014.

(51) Int. Cl.
| | | |
|---|---|---|
| *B65B 69/00* | (2006.01) | |
| *A01C 7/04* | (2006.01) | |
| *A01C 7/20* | (2006.01) | |
| *A01C 21/00* | (2006.01) | |
| *A01C 15/00* | (2006.01) | |

(52) U.S. Cl.
CPC ........ *B65B 69/0008* (2013.01); *A01C 15/006* (2013.01); *A01C 21/005* (2013.01); *B65B 69/0033* (2013.01)

(58) Field of Classification Search
CPC ............ B65B 69/0008; B65B 69/0033; A01C 2001/048; A01C 7/08; A01C 7/18; A01C 7/163
USPC .... 221/9–14, 197, 26, 27, 66; 222/166, 167, 222/172; 111/170, 177
See application file for complete search history.

(56) References Cited

U.S. PATENT DOCUMENTS

| | | | | |
|---|---|---|---|---|
| 3,853,235 | A | * 12/1974 | Lambert | ............. B65B 69/0008 414/412 |
| 3,886,875 | A | * 6/1975 | Ernst | ........................ A01C 7/04 111/135 |
| 4,092,936 | A | 6/1978 | Griffin et al. | |
| 4,863,037 | A | 9/1989 | Stevens et al. | |
| 4,934,892 | A | 6/1990 | Smith et al. | |
| 5,044,518 | A | 9/1991 | Sakaue et al. | |
| 5,240,116 | A | 8/1993 | Stevens et al. | |
| 5,310,062 | A | 5/1994 | Stevens et al. | |
| 5,374,152 | A | 12/1994 | Tovini et al. | |

(Continued)

FOREIGN PATENT DOCUMENTS

| | | |
|---|---|---|
| CN | 201846595 | 6/2011 |
| CN | 202145739 | 2/2012 |

(Continued)

*Primary Examiner* — John G Weiss
(74) *Attorney, Agent, or Firm* — Charles W. Arnett; Faegre Baker Daniels LLP

(57) ABSTRACT

A method and apparatus for automatically opening a seed packet and dispensing the contents of the same for planting is disclosed.

39 Claims, 9 Drawing Sheets

(56) References Cited

U.S. PATENT DOCUMENTS

| | | |
|---|---|---|
| 5,439,118 A | 8/1995 | York |
| 5,440,861 A | 8/1995 | Lund |
| 5,460,273 A | 10/1995 | Stevens et al. |
| 5,474,414 A | 12/1995 | Tovani et al. |
| 5,524,559 A * | 6/1996 | Davidson ............... A01C 7/081 |
| | | 111/177 |
| 5,651,445 A | 7/1997 | Stevens et al. |
| 5,664,402 A | 9/1997 | Sandvik et al. |
| 5,915,313 A | 6/1999 | Bender et al. |
| 5,924,371 A | 7/1999 | Flamme et al. |
| 5,974,348 A | 10/1999 | Rocks |
| 6,064,023 A | 5/2000 | Lile et al. |
| 6,070,539 A | 6/2000 | Flamme et al. |
| 6,079,340 A | 6/2000 | Flamme et al. |
| 6,243,987 B1 | 6/2001 | Hessel |
| 6,474,500 B1 * | 11/2002 | Carr ........................ A01C 7/04 |
| | | 221/25 |
| 6,505,124 B2 | 1/2003 | Carr et al. |
| 6,615,754 B2 | 9/2003 | Unruh et al. |
| 6,688,037 B2 | 2/2004 | Keller et al. |
| 6,705,827 B2 | 3/2004 | Keller et al. |
| 6,832,567 B2 | 12/2004 | Carr et al. |
| 7,111,567 B2 | 9/2006 | Carr et al. |
| 7,673,572 B2 | 3/2010 | Deppermann et al. |
| 7,775,167 B2 | 8/2010 | Stehling et al. |
| 7,938,075 B1 | 5/2011 | Glendenning et al. |
| 7,938,284 B2 | 5/2011 | Goldman et al. |
| 7,975,632 B2 | 7/2011 | Gogerty et al. |
| 8,048,318 B1 * | 11/2011 | Mogan ................ B65B 69/0033 |
| | | 206/497 |
| 8,221,968 B2 | 7/2012 | Becker et al. |
| 8,286,387 B2 | 10/2012 | Becker et al. |
| 8,336,469 B2 | 12/2012 | Preheim et al. |
| 8,375,941 B2 * | 2/2013 | King ................ A61M 15/0028 |
| | | 128/203.12 |
| 8,473,168 B2 | 6/2013 | Goldman et al. |
| 8,631,749 B2 | 1/2014 | Sauder et al. |
| 8,639,383 B2 | 1/2014 | Goldman et al. |
| 8,887,938 B2 | 11/2014 | Goldman et al. |
| 8,915,200 B2 | 12/2014 | Barsi et al. |
| 8,958,992 B2 | 2/2015 | Macy et al. |
| 9,002,070 B2 | 4/2015 | Johnson et al. |
| 9,060,462 B2 | 6/2015 | Deppermann et al. |
| 9,313,939 B2 | 4/2016 | Hood et al. |
| 9,387,518 B2 | 7/2016 | Deppermann et al. |
| 2001/0005688 A1 | 6/2001 | Carr et al. |
| 2004/0016129 A1 | 1/2004 | Lammers et al. |
| 2004/0144021 A1 | 7/2004 | Keller et al. |
| 2009/0118910 A1 | 5/2009 | Carr et al. |
| 2013/0079917 A1 | 3/2013 | Deppermann et al. |
| 2013/0152836 A1 | 6/2013 | Deppermann et al. |
| 2013/0192135 A1 | 8/2013 | Deppermann et al. |
| 2015/0034638 A1 | 2/2015 | Goldman et al. |
| 2015/0071745 A1 | 3/2015 | Barsi et al. |

FOREIGN PATENT DOCUMENTS

| | | |
|---|---|---|
| CN | 202190524 | 4/2012 |
| DE | 102007062967 | 6/2009 |
| KR | 20080071671 | 8/2008 |
| WO | 8801543 | 3/1988 |
| WO | 9517975 | 7/1995 |
| WO | 2008006056 | 1/2008 |
| WO | 2008116903 | 10/2008 |
| WO | 2009006733 | 1/2009 |
| WO | 2009008875 | 1/2009 |
| WO | 2011053286 | 5/2011 |
| WO | 2011119281 | 9/2011 |
| WO | 2011125965 | 10/2011 |

* cited by examiner

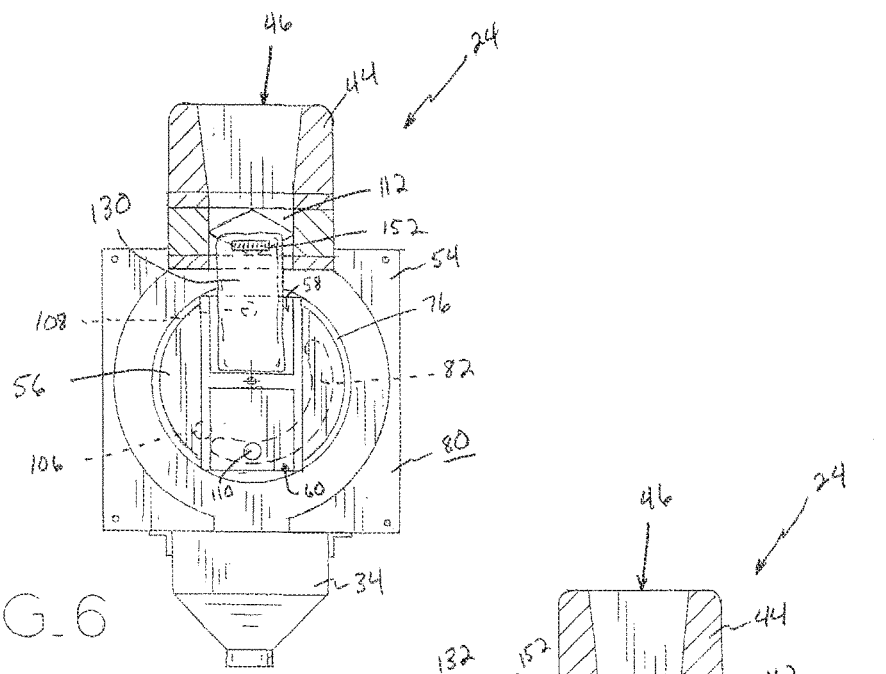
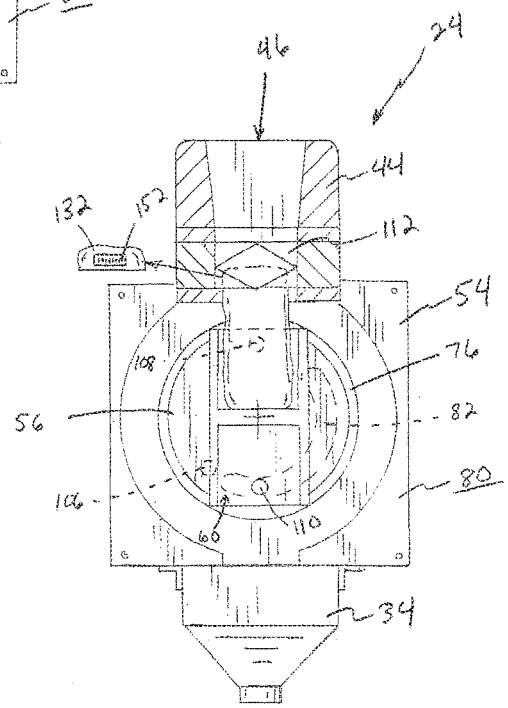
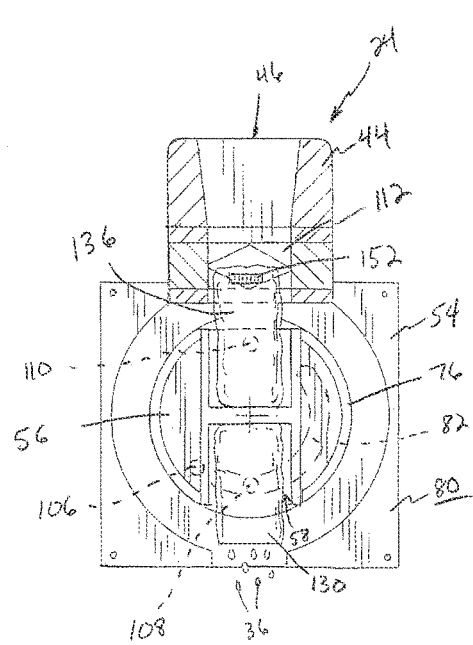

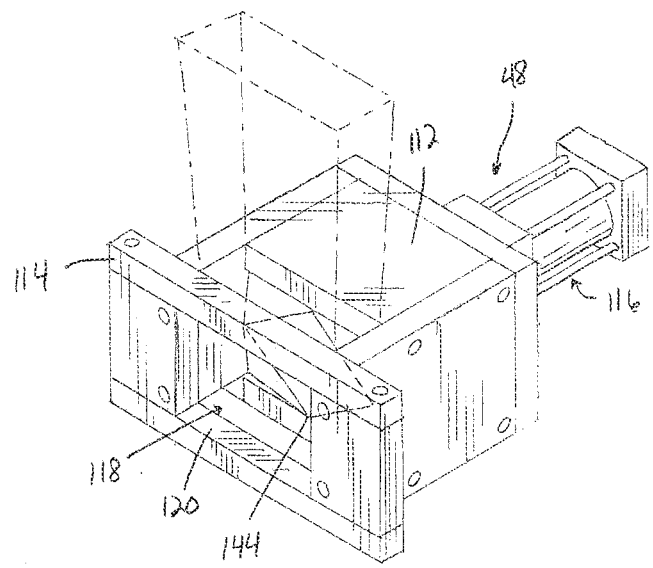
FIG_11
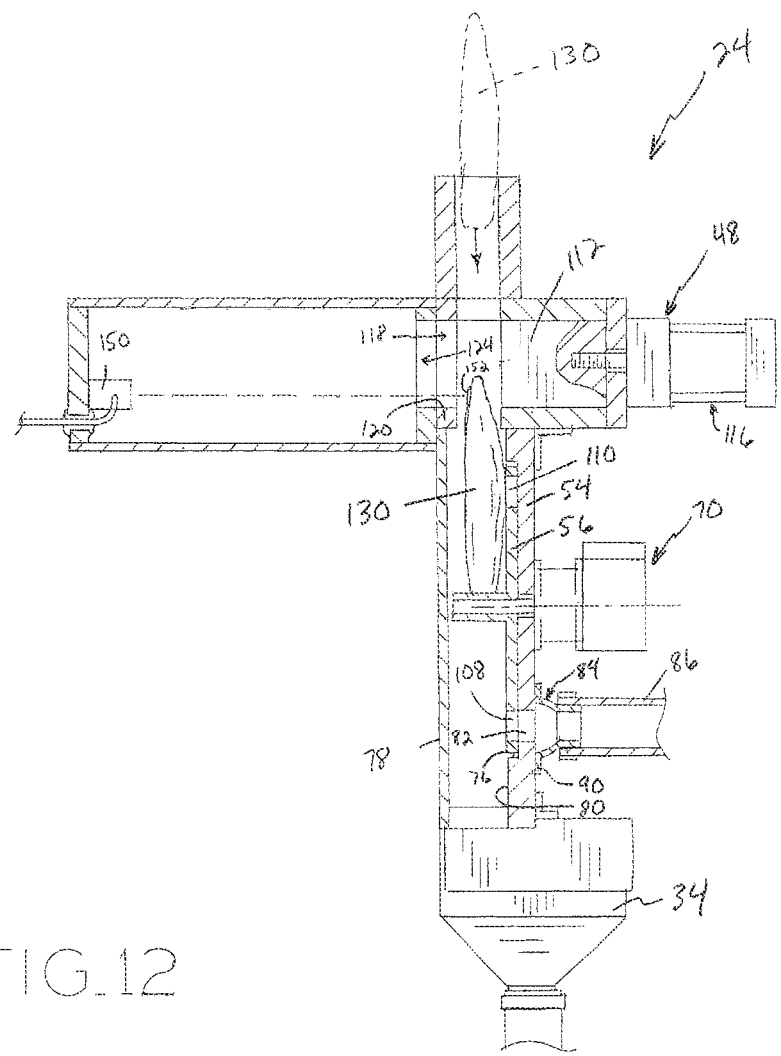
FIG_12

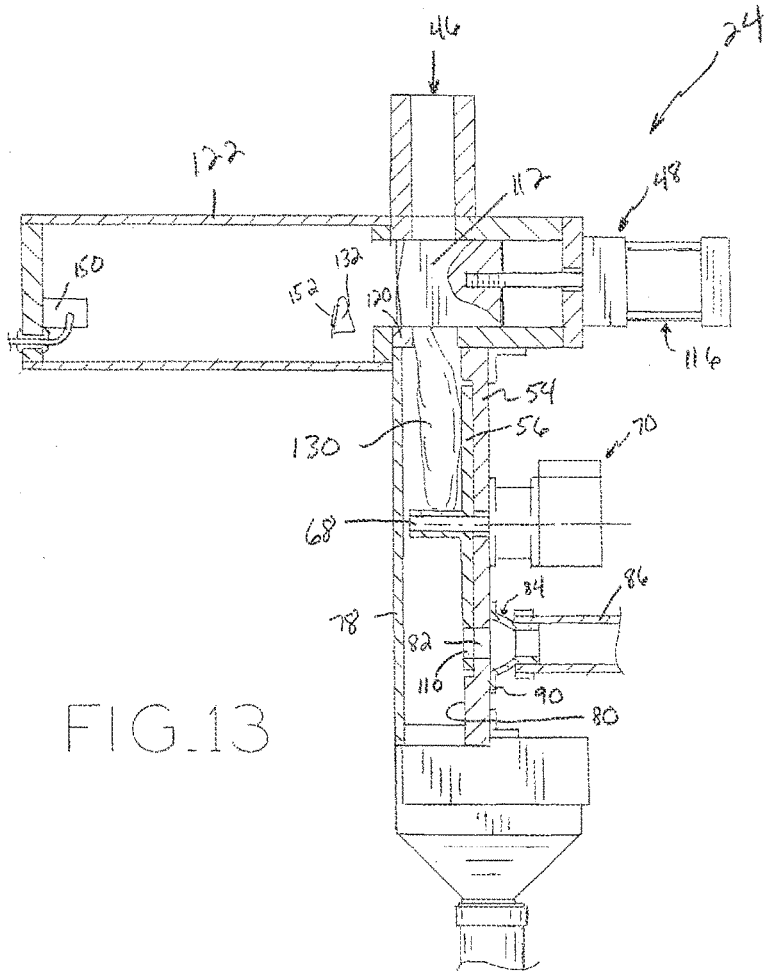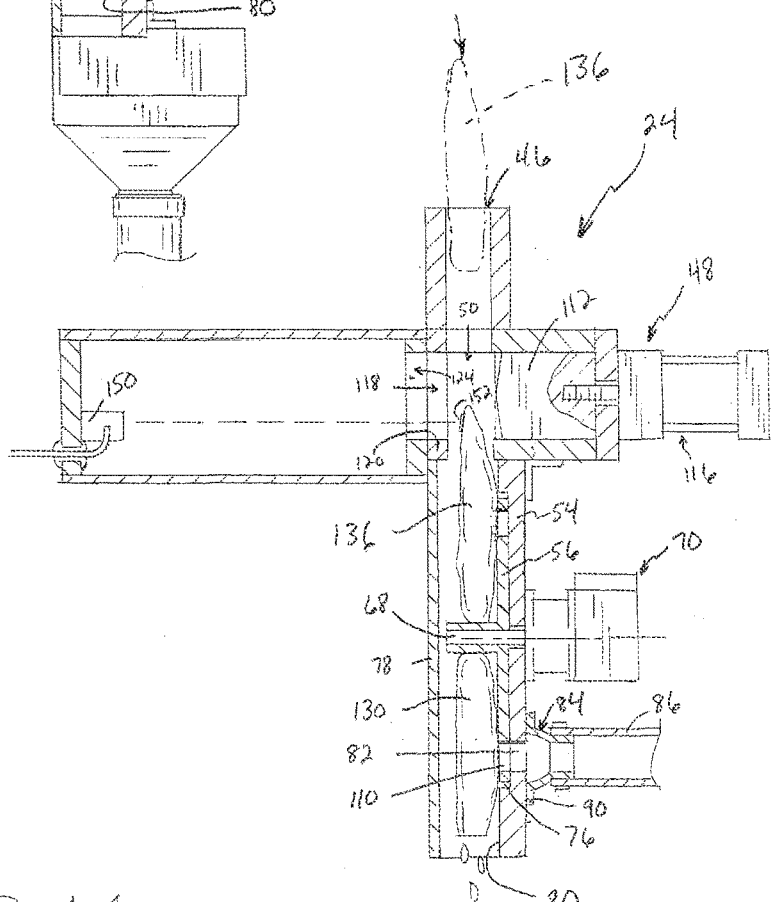
FIG. 13
FIG. 14

METHOD AND APPARATUS FOR AUTOMATED OPENING AND DISPENSING OF SEED FROM A CONTAINER

RELATED APPLICATIONS

This application claims the benefit of U.S. Provisional Application No. 62/091,038, filed Dec. 12, 2015, docket DAS-75594-01-US-E, titled METHOD AND APPARATUS FOR AUTOMATED OPENING AND DISPENSING OF SEED FROM A CONTAINER, the entire disclosure of Which is expressly incorporated by reference herein.

BACKGROUND

1. Technical Field

The present disclosure relates to a method and apparatus for automated opening and dispensing of seed from a seed container and, more particularly, to a method and apparatus for automated opening and dispensing of seed for planting a research plot.

2. Brief Description of the Related Art

Research plots may be utilized to evaluate seed varieties. Specifically, seeds from one or more specific source, genotype, population and/or breeding line may be planted to allow researchers to evaluate characteristics of the plants growing from such seeds, as well as the characteristics of any crops produced from the plants.

Research plots can be planted by manually opening small paper packages containing the desired seeds to plant the same in the research plot. Known research plot planters such as those available from Seed Research Equipment Solutions of South Hutchinson, Kans. (SRES), and ALMACO of Nevada, Iowa, are designed to be pulled behind a tractor or similar mode of conveyance. Known research plot planters such as those available from ALMACO and SRES accommodate operators who manually open seed packets and pour the contents of the same into a hopper for dispensing into rows of the research plot. The operator of the research plot planter then discards the empty seed packages and repeats the process. This manual process is highly repetitive and must be completed within a brief time interval.

SUMMARY

In an exemplary embodiment of the present disclosure, a method and apparatus for automatically opening a seed packet and dispensing the contents of the same for planting in a research plot is provided.

An exemplification of the present disclosure includes an automatic packet opener and dispenser which accepts unopened packets which it then automatically opens, empties into the planter hopper and discards the empty packets. Operation of this device can be triggered by the planter's controller. The planter's air, vacuum and/or electrical sources may be utilized in conjunction with certain exemplifications of a device in accordance with the present disclosure.

The automated planter and method of utilizing the same of the present disclosure increases throughput of the highly repetitive manual task of planting research plots.

In an exemplification thereof, the present disclosure provides an automatic opener and dispenser. The automatic opener and dispenser comprising a packet receiver including a first packet receptacle and a second packet receptacle, the packet receiver movably supported by a support, the packet receiver sized, shaped and configured to receive and support two packets simultaneously, one in the first packet receptacle and another in the second packet receptacle; a packet opener supported by the support and positioned relative to the packet receiver to allow the packet opener to selectively open a packet supported by one of the first packet receptacle and the second packet receptacle; an automatic drive supported by the support and operably connected to the packet receiver, the automatic drive operable to actuate the packet receiver through a cyclical movement including a plurality of cycles. Each cycle of the plurality of cycles including: a first packet opening/second packet dispensing stage corresponding to a position of the packet receiver in which the first packet receptacle is positioned such that the packet opener is operable to open a packet supported in the first packet receptacle and the second packet receptacle is simultaneously positioned such that an opened packet supported in the second packet receptacle is positioned such that a content of the second packet is dispensed, and a first packet dispensing/second packet opening stage corresponding to a position of the packet receiver in which the first packet receptacle is positioned such that an opened packet supported in the first packet receptacle is positioned such that a content of the first packet is dispensed and the second packet receptacle is simultaneously positioned such that the packet opener is operable to open a packet supported in said second packet receptacle. In this exemplification of the present disclosure, the packet receiver is sized, shaped and configured to simultaneously support packets in both the first packet receptacle and the second packet receptacle in both the first packet opening/second packet dispensing stage and the first packet dispensing/second packet opening stage. In a variation thereof, the packet opener may comprise a shear moveably supported relative to the support and positioned to be moveable to shear the packet supported by one of the first packet receptacle and the second packet receptacle. In a further variation, the shear may comprise a die cutter. In another variation, the packet receiver may comprise a turntable rotatably supported by the support in a generally vertical orientation in this variation of the present disclosure, each cycle of the plurality of cycles includes a complete 360 degree rotation of the turntable. In a further variation, the first packet receptacle of the packet receiver comprises a first packet support and the second packet receptacle of the packet receiver comprises an opposing second packet support, the first packet support including an end wall and a pair of spaced first packet support sidewalls extending along a first direction from the end wall, the second packet support sharing the end wall of the first packet support and further including a pair of spaced second packet support sidewalls extending along a second direction from the end wall, the first direction opposite the second direction, whereby, when the first packet support is oriented as an upward opening U-shape, the second packet support is oriented as a downward opening U-shape. In another variation thereof, the automatic packet opener and dispenser may further comprise a negative pressure source selectively in fluid communication with one of the first packet receptacle and the second packet receptacle to hold a packet therein against the force of gravity. In a further variation, the packet receiver defines a first aperture in fluid communication with the first packet receptacle and a second aperture in fluid communication with the second packet receptacle, and wherein the support defines a negative pressure channel in fluid communication with the source of negative pressure, the negative pressure channel selectively in fluid communication separately with each of said first aperture and the second aperture during a portion of each cycle of said plurality of cycles. In a further variation thereof, the packet receiver may comprise a turntable rotatably supported by the support in a generally vertical orientation and wherein each cycle of the plurality of cycles includes a complete 360 degree rotation of the turntable, and wherein a negative pressure channel in the support comprises an arcuate negative pressure channel, the arcuate negative pressure channel sized and arranged so that the negative pressure channel is in fluid communication separately with each of the first aperture and the second aperture through less than the complete 360 degree rotation of the turntable during each of the plurality of cycles. In yet a further variation, a positive pressure source is selectively in fluid communication with one of the first packet receptacle and the second packet receptacle to discharge a packet therein from the packet receiver, the positive pressure source in fluid communication with one of the first packet receptacle and the second packet receptacle after the one of the first packet receptacle and the second packet receptacle is positioned such that an opened packet supported in the one of the first packet receptacle and the second packet receptacle is positioned such that a content of the open packet supported in the one of the first packet receptacle and the second packet receptacle is dispensed, wherein the support defines a positive pressure aperture in fluid communication with the source of positive pressure, the positive pressure aperture selectively in fluid communication separately with each of the first aperture and the second aperture to selectively and separately place the positive pressure source in fluid communication with each of the first packet receptacle and the second packet receptacle during each cycle of the plurality of cycles. In yet another variation thereof, the automatic packet opener and dispenser may include a positive pressure source selectively in fluid communication with one of the first packet receptacle and the second packet receptacle to discharge a packet therein from the packet receiver, the positive pressure source in fluid communication with one of the first packet receptacle and the second packet receptacle after the one of the first packet receptacle and the second packet receptacle is positioned such that an opened packet supported in the one of the first packet receptacle and the second packet receptacle is positioned such that a content of the opened packet supported in the one of the first packet receptacle and the second packet receptacle is dispensed. In a further variation, the automatic drive may comprise a controller operable to actuate the automatic drive to actuate the packet receiver through the continuous cyclical movement, wherein the controller is communicatively connected to the packet opener and operable to actuate the packet opener to open a packet in the first packet receptacle in the first packet opening/second packet dispensing stage of each cycle of the plurality of cycles and thereafter to actuate the automatic drive to oscillate the packet receiver and thereafter to actuate the automatic drive to position the second packet receptacle so that the positive pressure source is in fluid communication with the second packet receptacle through a second aperture in the packet receiver and to dwell for a predetermined time period with the positive pressure source in fluid communication with the second packet receptacle to allow the positive pressure source to discharge a packet in the second packet receptacle and thereafter to actuate the automatic drive to actuate the packet receiver to the first packet dispensing/second packet opening stage and thereafter to actuate the packet opener to open a packet in the second packet receptacle, and thereafter to actuate the automatic drive to oscillate the packet receiver and thereafter to actuate the automatic drive to position the first packet receptacle so that the positive pressure source is in fluid communication with the first packet receptacle through a first aperture in the packet receiver and to dwell for the predetermined time period with the positive pressure source in fluid communication with the first packet receptacle to allow the positive pressure source to discharge a packet in the first packet receptacle and to continuously repeat these steps to create the cyclical movement. In yet another variation thereof, the automatic drive may comprise a controller operable to actuate the automatic drive to actuate the packet receiver through the cyclical movement. In a further variation thereof, the controller may be communicatively connected to the packet opener and operable to actuate the packet opener to open a packet in the first packet receptacle in the first packet opening/second packet dispensing stage of each cycle of the plurality of cycles and thereafter to actuate the automatic drive to actuate the packet receiver to said first packet dispensing/second packet opening stage and thereafter to actuate the packet opener to open a packet in the second packet receptacle, and to repeat these steps to create the cyclical movement. In yet a further variation, the controller may be operable to actuate the automatic drive to oscillate the packet receiver after each actuation of the packet opener to open a packet, but before actuating the packet receiver between the first packet opening/second packet dispensing stage and the first packet dispensing/second packet opening stage or vice versa. In yet another variation, the automatic drive may comprise an electric motor. In a further variation thereof, the electric motor may comprise a stepper motor. Any aspect described in one of the aforementioned variations may be mixed and matched with other aspects of other variations in accordance with the present disclosure.

In another exemplification thereof, the present disclosure provides a method of opening and dispensing a content of a packet including the steps of: supporting a first packet with a packet receiver; opening the first packet to create a first packet opening while the first packet is supported by the packet receiver; moving the first packet to a dispensing position while the first packet is supported by the packet receiver; dispensing a content of the first packet through the first packet opening while the first packet is supported by the packet receiver; supporting a second packet with the packet receiver during the step of dispensing the content of the first packet through the first packet opening, whereby the second packet and the first packet are simultaneously supported by the packet receiver; and during both the step of supporting a second packet with the packet receiver and the step of dispensing the content of the first packet through the first packet opening, opening the second packet to create a second packet opening, whereby the second packet is opened while the content of the first packet is dispensed. In a variation thereof, the step of dispensing the content of the first packet through the packet opening may comprise the step of positioning the first packet opening so that gravity will act on the content of the first packet to pull the content of the first packet out of the first packet through the opening. In a further variation thereof, the step of dispensing the content of the first packet may further comprise the step of oscillating the first packet while the first packet opening is positioned so that gravity will act on the content of the first packet to pull the content of the first packet out of the first packet through the opening and while the first packet is supported by the packet receiver. In another variation thereof, the step of supporting the first packet with the first packet receiver may comprise the step of holding the first packet against the packet receiver during the step of moving the first packet to a dispensing position. In a further variation thereof, the step of holding the first packet against the packet receiver during the step of moving the first packet to a dispensing position may comprise applying a negative pressure to the first packet through an aperture in the packet receiver during the step of moving the first packet to the dispensing station, whereby the negative pressure holds the first packet against the force of gravity. In yet another variation thereof, the method may further include the step of discharging the first packet from the first packet receiver after the step of dispensing the content of the first packet through the first packet opening. In a further variation thereof, the step of discharging the first packet from the packet receiver may comprise applying a positive pressure to the first packet through an aperture in the packet receiver, whereby the positive pressure forces the first packet out of the packet receiver. In yet another variation thereof, the method may further comprise the step of holding the first packet against the packet receiver with negative pressure during at least part of the step of moving the first packet to a dispensing position. In a further variation thereof the method may further include the step of applying a positive pressure to the first packet after the dispensing step to discharge the first packet from the packet receiver. In another variation thereof, step of opening the first packet to create a first packet opening may comprise the step of shearing an end of the first packet to create the first packet opening. In certain embodiments, the step of shearing may be effected with a die cutter. In a further variation thereof, the packet receiver comprises a turntable rotatably supported by a support in a generally vertical orientation and the step of moving the first packet to a dispensing position while the first packet is supported by the packet receiver comprises the step of rotating the turntable. In a further variation thereof, the packet receiver comprises a first packet receptacle comprising a first packet support comprising an end wall and a pair of spaced first packet support sidewalls extending along a first direction from the end wall, and the packet receiver further comprises a second packet receptacle comprising a second packet support comprising the end wall and a pair of spaced second packet support sidewalls extending along a second direction from the end wall, the first direction opposite the second direction, whereby, when the first packet support is oriented as an upward opening U-shape, the second packet support is oriented as a downward opening U-shape, and wherein the step of moving the first packet to a dispensing position while the first packet is supported by the packet receiver comprises rotating the turntable through 180 degrees. In yet another variation thereof, the step of moving the first packet to a dispensing position comprises the step of actuating an electric motor to move the packet receiver to the dispensing position. Any aspect described in one of the aforementioned variations may be mixed and matched with other aspects of other variations in accordance with the present disclosure.

In another exemplification thereof, the present disclosure provides a planter for planting a first plurality of seeds contained in a first container and a second plurality of seeds contained in a second container, the planter of this exemplification of the present disclosure includes: a frame; at least one seed metering device supported by the frame; a seed dispensing device supported by the frame, the seed dispensing device including a first stage whereat the first container is automatically opened and a second stage whereat the first plurality of seeds are dispensed from the first container; and a controller operably coupled to the seed dispensing device, the controller controlling the opening of the first container when the first container is in the first stage and the controller controlling a movement of the first container to the second stage, the second container being automatically opened prior to the first container exiting the second stage. In a variation thereof, the seed dispensing device may include a third stage whereat the first container is discharged from the seed dispensing device. In another variation thereof, the seed dispensing device may comprise a packet receiver comprising a first packet receptacle and a second packet receptacle, the packet receiver movably supported relative to the frame, the packet receiver sized, shaped and configured to receiver and support two packets simultaneously in the first packet receptacle and the second packet receptacle; and a packet opener supported by the frame and positioned relative to the packet receiver to automatically open the first container at the first stage of the seed dispensing device, the packet opener communicatively connected to the controller, whereby the controller actuates the packet opener to open the first container at the first stage. In a further variation, the packet opener may comprise a shear movably supported relative to the frame and positioned to be moveable to shear the first container in the first stage. In a further variation thereof the packet receiver may comprise a turntable rotatably supported relative to the frame in a generally vertical orientation, and wherein the first packet receptacle of the packet receiver comprises a first packet support and the second packet receptacle of the packet receiver comprises an opposing second packet support, the first packet support comprising an end wall and a pair of spaced first packet support sidewalls extending along a first direction from the end wall, the second packet support comprising the end wall and a pair of spaced second packet support sidewalls extending along a second direction from the end wall, the first direction opposite the second direction, whereby, at the first stage, the first packet support is oriented as an upward opening U-shape and the second packet support is oriented as a downward opening U-shape. In yet another variation thereof the planter may further include a negative pressure source selectively in fluid communication with the first container in the second stage whereat the first plurality of seeds are dispensed from the first container. In a variation including the third stage whereat the first container is discharged from the seed dispensing device, the planter may further include a positive pressure source selectively in fluid communication with the first container in the third stage. In yet another variation thereof, the controller may oscillate the seed dispensing device during the second stage. In yet another variation thereof the planter may further include an electric motor connected for driving the seed dispensing device, the electric motor communicatively connected to the controller, whereby the controller is operable to control an actuation of the electric motor. Any aspect described in one of the aforementioned variations may be mixed and matched with other aspects of other variations in accordance with the present disclosure.

The above-mentioned and other features of the invention and the manner of obtaining them, will become more apparent and the invention itself will be better understood by reference to the following description of exemplary embodiments of the invention taken in conjunction with the accompanying drawings. These above-mentioned and other features of the invention may be used in any combination or permutation.

BRIEF DESCRIPTION OF THE DRAWINGS

FIG. 6 is a partial sectional, front elevational view of the seed packet opening and dispensing device of FIGS. 3-5, illustrating a first seed packet inserted therein;

FIG. 7 is a partial sectional, front elevational view of the seed packet opening and dispensing device of FIG. 3-5, illustrating opening of a seed packet inserted therein;

FIG. 9 is a partial sectional, front elevational view of the seed packet opening and dispensing device of FIGS. 3-5, illustrating a second seed packet inserted therein, with a first seed packet inverted to facilitate dispensing the contents thereof;

FIG. 11 is a perspective view of a die cutter utilized in accordance with an exemplification of the present disclosure;

FIGS. 12-14 are a sectional, radial elevation views of the seed dispensing device shown in the preceding figures, with FIG. 13 illustrating actuation of a die cutter to open a seed packet positioned in the seed dispensing device.

Figure 1:
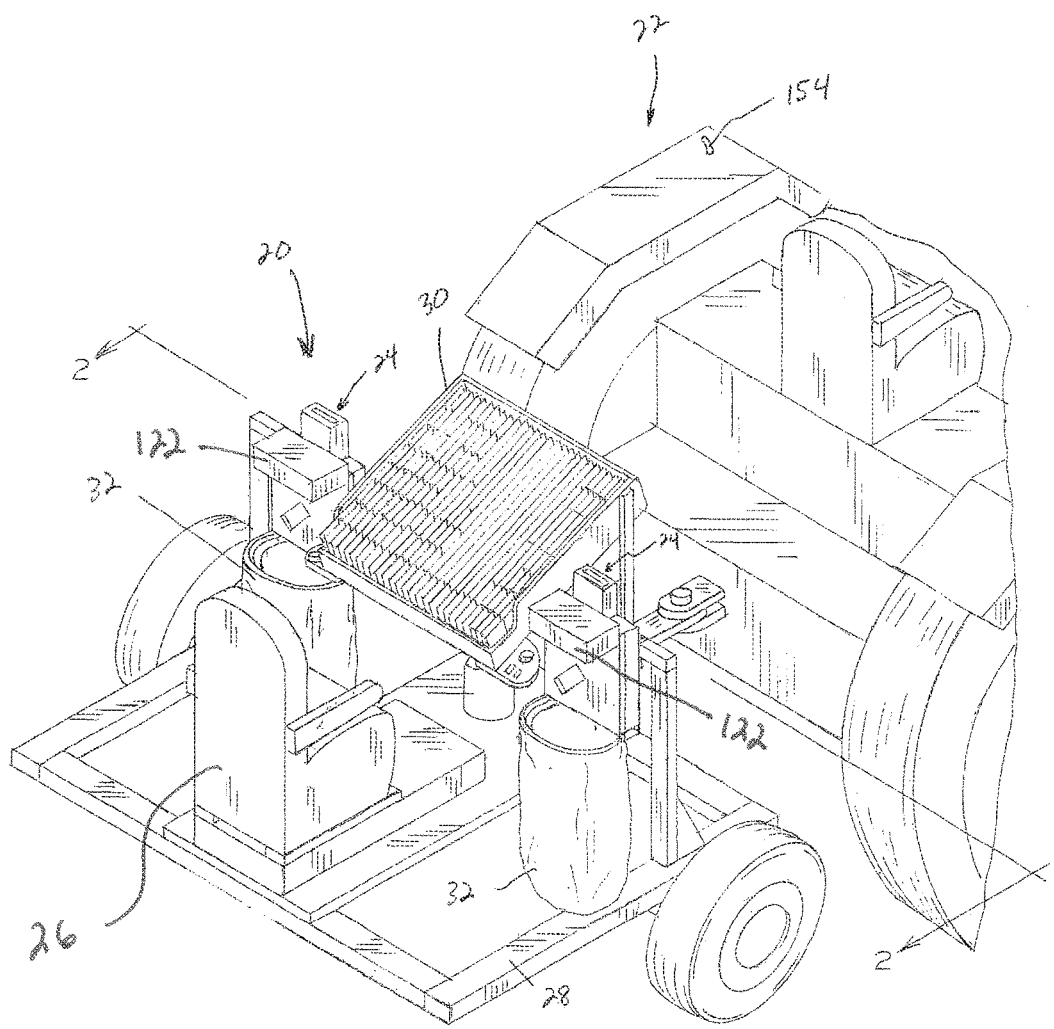
FIG. 1 is a partial perspective view of a seed planter in accordance with the present disclosure secured to a tractor used to transport the seed planter over a research plot.

Corresponding reference characters indicate corresponding parts throughout the several views. Although the drawings represent an embodiment of the present invention, the drawings are not necessarily to scale and certain features may be exaggerated in order to better illustrate and explain the present invention. The exemplifications set out herein illustrate embodiments of the invention, and such exemplifications are not to be construed as limiting the scope of the invention in any manner.

DETAILED DESCRIPTION

The embodiments disclosed below are not intended to be exhaustive or limit the invention to the precise forms disclosed in the following detailed description. Rather, the embodiments are chosen and described so that others skilled in the art may utilize their teachings.

FIG. 1 illustrates research plot planter 20 operably connected to tractor for being pulled by the tractor through a research plot. Research plot planter 20 includes a pair of automated seed packet opening and dispensing stations 24 and operator seat 26. Automated seed packet opening and dispensing stations 24 and operator seat 26 are both supported by a support in the form of frame 28 of research plot planter 20. Seed container rack 30 is also supported atop frame 28 and is positioned intermediate automated seed packet opening and dispensing stations 24. In use, an operator seated on operator seat 26 may withdraw seed packets from seed container rack 30 for placement in automated seed packet opening and dispensing stations 24. Once the seed packets are positioned in one of automated seed packet opening and dispensing stations 24, the packets are automatically opened and the seeds contained therein are automatically dispensed for planting in the research plot. Further, the empty containers are automatically discharged into, e.g., waste containers 32, as will be further described hereinbelow. For the purposes of this document, the word "packet" and/or "seed packet" is not to be construed as limited to a paper seed packet or pouch but is meant to encompass any container or package suitable for containing seeds and/or liquid contents to be planted in the research plot.

Figure 2:
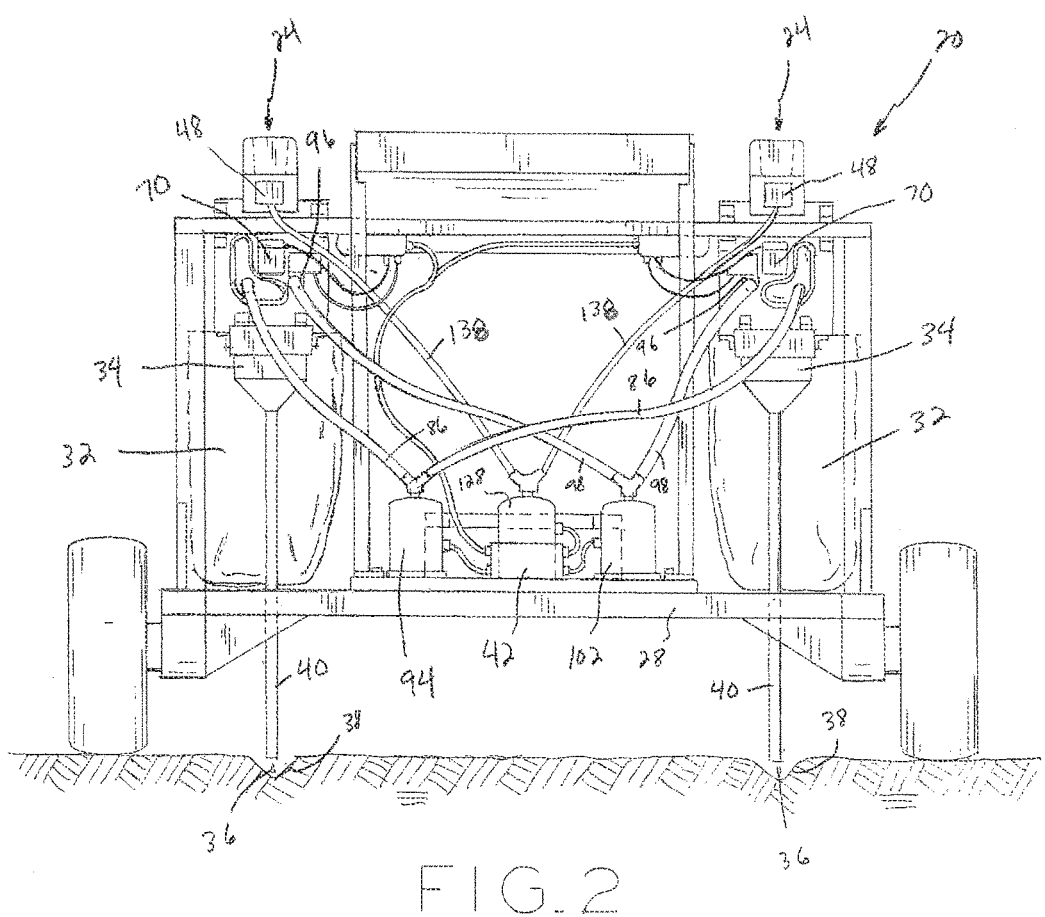
FIG. 2 is an elevational view illustrating the seed planter of FIG. 1 dispensing seeds into a pair of rows of a test plot.

Referring to FIG. 2, automated seed packet opening and dispensing stations 24 have seed metering devices 34 connected thereto. As will be described in detail below, automated seed packet and opening dispensing stations 24 automatically open seed packets and dispense the contents thereof into seed metering devices 34 which provide seeds 36 to rows 38 (through chutes 40) in spaced intervals. As is known in the art, seed metering devices 34 can be communicatively connected to and controlled by a controller such as planter controller 42 shown in FIG. 2. Controller 42 may receive input from a speedometer or other source of the speed of research plot planter 20 such that seeds 36 are dispensed at a rate through seed metering devices 34 that will produce a desired distance between adjacent seeds 36 in rows 38. If an ALMACO planter is utilized, the seed metering devices are integrated into the planter (i.e., the seed metering devices are part of the planter).

Figure 3:
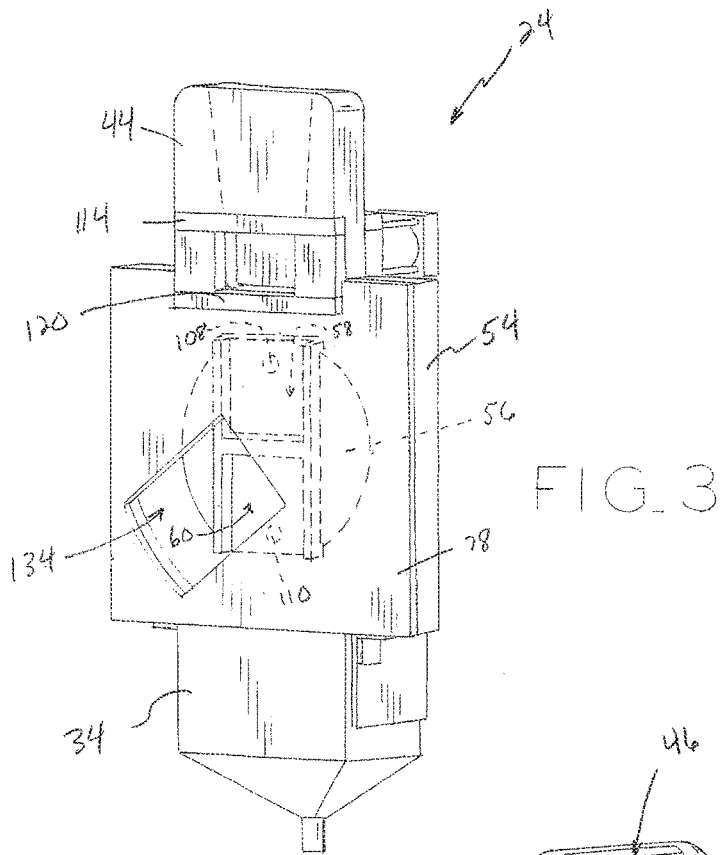
FIG. 3 is a front perspective view of an automated seed packet opening and dispensing device in accordance with an embodiment of the present disclosure.
Figure 4:
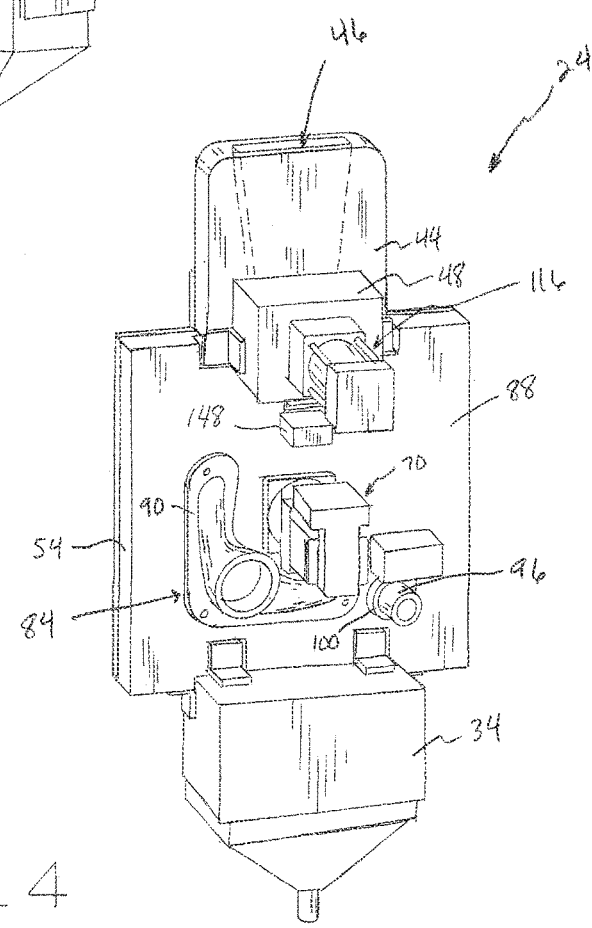
FIG. 4 is a rear perspective view of the seed packet opening and dispensing device of FIG. 3.
Figure 5:
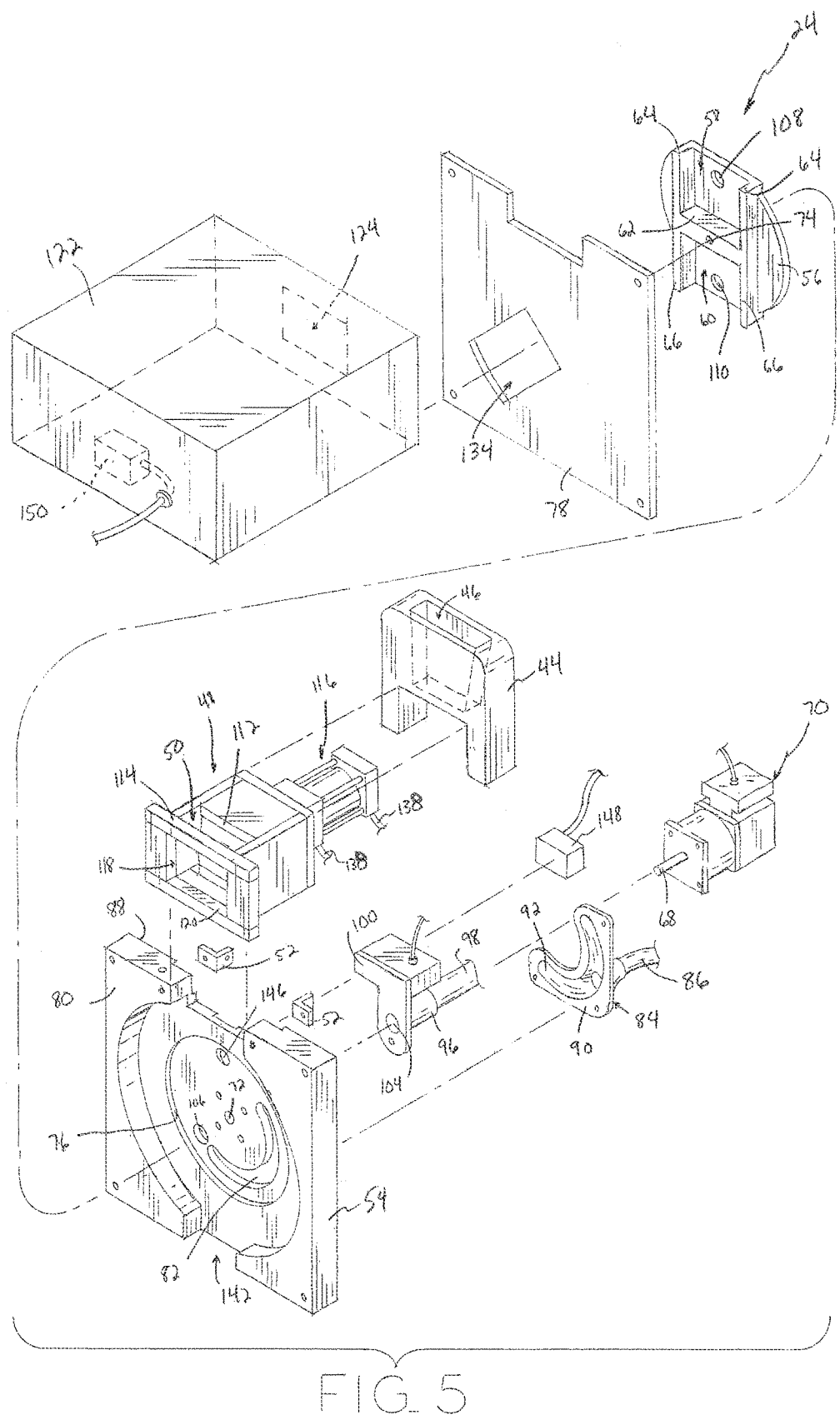
FIG. 5 is an exploded view of the seed packet opening and dispensing device of FIGS. 3 and 4.

FIGS. 3-5 illustrate the components of each automated seed packet opening and dispensing stations 24. Referring to FIGS. 3-5, each automated seed packet opening and dispensing station 24 includes a funnel 44 defining a tapered channel presenting opening 46 into which a seed packet can be positioned to traverse the tapered aperture extending through funnel 44. At the end of the tapered aperture of funnel 44 opposite opening 46 is positioned a packet opener in the form of die cutter 48. A seed packet traversing the tapered aperture through funnel 44 would next encounter seed packet chute 50 (FIG. 5) through die cutter 48. Angle brackets 52 may be utilized in conjunction with mechanical fasteners such as lag screws or lag bolts to secure die cutter 48 and funnel 44 to a support, e.g., in the form of housing plate 54.

Packet receiver 56 includes first packet receptacle 58 and second packet receptacle 60. First packet receptacle 58 and second packet receptacle 60 form opposing supports for two seed packets. First packet receptacle 58 is formed by end wall 62 and spaced first packet support side walls 64. Side walls 64 and end wall 62 cooperate to form a U-shaped packet support. Similarly, second packet receptacle 60 is defined by end wall 62 and second packet support side walls 66. Second packet support side walls 66 and end wall 62 cooperate to form a U-shaped packet support. As illustrated in FIG. 5, when first packet receptacle 58 is oriented as an upper opening U-shape, second packet receptacle 60 is oriented as a downward opening U-shape. First packet support side walls 64 and second packet support sidewalls 66 are spaced such that packet receptacles 58, 60 are sized to receive a seed packet therein. Specifically, first packet support side walls 64 and second packet support sidewalls 66 are spaced to accommodate the width of a seed packet utilized with automated seed packet opening and dispensing stations 24.

Packet receiver 56 is movably supported (more specifically, rotatably supported) by housing plate 54 and, consequently, by frame 28 of research seed plot planter 20. Specifically, drive shaft 68 extending from motor 70 extends through central aperture 72 in housing plate 54 and thereafter through central aperture 74 in packet receiver 56. Drive shaft 68 is fixedly secured to packet receiver 56 such that packet receiver 56 is not relatively rotatable with respect to drive shaft 68. Stated another way, rotation of drive shaft 68 by motor 70 causes rotation of packet receiver 56. Drive shaft 68 may be fixed relative to packet receiver 56, e.g., by wider sizing central aperture 74 of packet receiver 56 relative to the diameter of drive shaft 68 such that an interference fit is created. A variety of mechanical fasteners may also be utilized to fixedly secure drive shaft 68 relative to packet receiver 56 furthermore, an adhesive may be positioned between drive shaft 68 and packet receiver 56 to effect securement therebetween. Central aperture 72 of housing plate 54, on the other hand, is sized to provide clearance relative to drive shaft 68 such that drive shaft 68 is rotatable through central aperture 72 relative to housing plate 54. In an exemplary embodiment, housing plate 54 is formed of a material such as a polymeric material that itself will act as a sufficient bearing material against rotation of drive shaft 68. In alternative exemplary embodiments, central aperture 72 may be sized such that drive shaft 68 does not bear against the material of housing plate 54 during rotation of drive shaft 68. In a further alternative exemplary embodiment, a bearing may be interposed between drive shaft 68 and housing plate 54.

Fasteners such as lag bolts may be positioned through the apertures surrounding central aperture 72 in housing plate 54 and into the peripheral apertures surrounding drive shaft 68 of motor 70 to secure motor 70 to housing plate 54. With motor secured to housing plate 54 and driveshaft 68 secured to packet receiver 56, as described above, packet receiver 56 is rotatably supported by packet receiver 56. With motor 70 secured to housing plate 54 and packet receiver 56, motor 70 may be utilized to position packet receiver 56 relative to housing plate 54 and thereby relative to die cutter 48 and funnel 44 both of which are fixedly secured to housing plate 54, as described above. In this position, motor 70 may be utilized to actuate packet receiver 56 such that one of first packet receptacle 58 and second packet receptacle 60 are aligned with the tapered channel through funnel 44 and seed packet chute 50 of die cutter 48 so that a seed packet dropped through funnel 44 will traverse seed packet chute 50 to be positioned within the aligned packet receptacle of packet receiver 56.

Figure 8:
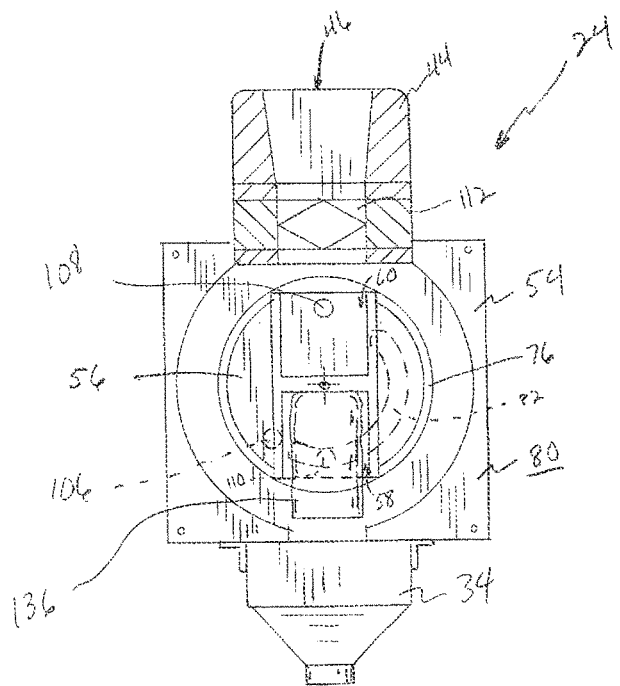
FIG. 8 is a partial sectional, front elevational view of the seed packet opening and dispensing device of FIGS. 3-5, illustrating a first seed packet inverted for dispensing of the contents thereof.

As illustrated in FIG. 5, housing plate 54 includes central undercut 76 sized to receive packet receiver 56, as illustrated, e.g., in FIGS. 6-8. With packet receiver 56, motor 70, die cutter 48 and funnel 44 secured to housing plate 54, front plate 78 may be secured to front face 80 of housing plate 54 by positioning fasteners through the four apertures found in the corners of front plate 78 and front face 80 of housing plate 54. In an exemplary embodiment, front plate 78 maintains a spacing relative to packet receiver 56 such that end wall 62, first packet support side walls 64 and second packet support side walls 66 maintain limited spacing relative to front plate 78. Specifically, such spacing is maintained small enough such that a seed packet positioned in first packet receptacle 58 or second packet receptacle 60 will not become lodged between packet receiver 56 and front plate 78 during actuation of automated seed packet opening and dispensing stations 24. In certain exemplary embodiments, end wall 62, first packet support side walls 64 and second packet support side walls 66 may lightly bear against front plate 78.

Referring to FIG. 5, arcuate negative pressure channel 82 is formed through housing plate 54. As illustrated in FIG. 4, vacuum adapter 84 is secured to back face 88 of housing plate 54. For example, a number of fasteners may be positioned through flange 90 of vacuum adapter 84 to secure vacuum adapter 84 to housing plate 54. Note that "negative pressure" and "vacuum" are used interchangeably throughout this document. In certain exemplary embodiments, a face seal may be interposed between flange 90 of vacuum adapter 84 and back face 88 of housing plate 54 to effect sealing therebetween. For example, a gasket may be so positioned as a face seal. Vacuum adapter 84 includes arcuate channel 92 which is generally coextensive with arcuate negative pressure channel 82 of housing plate 54 when vacuum adapter 84 is secured to housing plate 54 as described hereinabove. Arcuate channel 92 of vacuum adapter 84 is in fluid communication with negative pressure line 86 which is in fluid communication vacuum source 94, as illustrated in FIG. 2.

Air cylinder 96 includes flange 100 through which one or more fasteners may be positioned to secure air cylinder 96 to housing plate 54. As with vacuum adapter 84, a face seal such as a gasket may be interposed between flange 100 and back face 88 of housing plate 54 to affect air-tight sealing between air cylinder 96 and housing plate 54. Air cylinder 96 includes aperture 104 extending therethrough. Aperture 104 is in fluid communication with positive pressure line 98 which is further in fluid communication compressor 102 (FIG. 2). Further, aperture 104 through air cylinder 96 is in fluid communication with positive pressure port 106 which extends through housing plate 54.

Referring to FIG. 5, packet receiver 56 includes first aperture 108 extending therethrough and in fluid communication with first packet receptacle 58. Similarly, second aperture 110 extends through packet receiver 56 and is in fluid communication with second packet receptacle 60. As packet receiver 56 is rotated relative to housing plate 54, first aperture 108 and second aperture 110 are each selectively and sequentially in fluid communicate with arcuate negative pressure channel 82 and positive pressure port 106.

Referring again to FIG. 5, housing plate 54 includes proximity sensor aperture 146 extending therethrough. Proximity sensor aperture 146 is vertically aligned with central aperture 72 in housing plate 54 such that proximity sensor aperture 146 occupies a "12 o'clock position" relative thereto. Proximity sensor 148 is secured to back face 88 of housing plate 54 and is positioned such that a signal emitted by proximity sensor 148 can pass through proximity sensor aperture 146 unobstructed by housing plate 54. Proximity sensor 148 is capable of determining whether one of first aperture 108 and second aperture 110 through packet receiver 56 is in the 12 o'clock position. First aperture 108 and second aperture 110 of packet receiver 56 are centered relative to first packet support side walls 64 and second packet support side walls 66, respectively, such that when first aperture 108 is in the 12 o'clock position, first packet support side walls 64 are vertically oriented and end wall 62 is horizontally oriented, and when second aperture 110 is in the 12 o'clock position, second packet support side walls 66 are vertically oriented and end wall 62 is horizontally oriented. Stated another way, when first aperture 108 is in the 12 o'clock position, first packet receptacle 58 is oriented to receive a packet and when second aperture 110 is in the 12 o'clock position, second packet receptacle 60 is oriented to receive a packet. Proximity sensor 148 can be, for example, a photoelectric sensor capable of sensing packet receiver 56 when neither first aperture 108 nor second aperture 110 are aligned with proximity sensor aperture 146 (through which a signal from proximity sensor 148 is transmitted). Proximity sensor 148 is communicatively connected to controller 42 such that proximity sensor 148 is operable to communicate whether first aperture 108 or second aperture 110 are in the 12 o'clock position to controller 42.

Referring still to FIG. 5, die cutter 48 includes a shear in the form of reciprocating die 112 supported for reciprocation relative thereto by die cutter frame 114. Reciprocating die 112 is operably connected to pneumatic cylinder 116 such that pneumatic cylinder 116 is operable to reciprocate reciprocating die 112 relative to die cutter frame 114. Specifically, air lines 138 are connected to pneumatic cylinder 116 and are operable to selectively reciprocate a piston positioned within cylinder 116 through insertion and withdrawal of pressurized air on opposite sides of the piston (which is sealed relative to cylinder 116). A single air line 138 from each pneumatic cylinder 116 is illustrated connected to compressor 128 in FIG. 2; however, two air lines 138 from each pneumatic cylinder are connected to compressor 128. The piston is connected to reciprocating die 112 to reciprocate the same.

Reciprocating die 112 is reciprocateable between the retracted position illustrated in FIG. 5 and an extended position in which reciprocating die 112 extends through window 118 in die cutter frame 114 and reciprocatingly engages shear bar 120. Reciprocating die 112 is sized relative to window 118 such that reciprocating die 112 either contacts shear bar 120 when reciprocating die 112 extends through window 118 or is very closely spaced therefrom. Specifically, window 118 and reciprocating die 112 are relatively sized such that the top of a seed packet extending upwardly from shear bar 120 and into window 118 will be sheared on reciprocation of reciprocating die 112, as reciprocating die 112 pushes over shear bar 120. As illustrated in FIG. 11, reciprocating die 112 includes a lower cutting surface (that, in use, will contact shear bar 120 as described herein) that tapers away from parallel to shear bar 120 from midpoint 144. With this construction, shearing of a seed packet begins with midpoint 144 encountering shear bar 120 and spreads laterally therefrom on either side of midpoint 144.

Packet top collector 122 is secured relative to housing plate 54 and die cutter 48 such that a portion of a seed packet sheared from the top of such seed packet by reciprocating die 112 will be pushed by reciprocating die 112 through window 118 through die cutter frame 114 and further through window 124 (FIG. 5) and into an interior space defined by collector 122. Collector 122 is selectively securable relative to housing plate 54 such that it can be removed from automated seed packet opening and dispensing station 24 to allow for more permanent discarding of the sheared tops of seed packets produced during operation of automated seed packet opening and dispensing station(s) 24, as described in further detail hereinbelow. Throughout this document a single dispensing station 24 is described in detail, it being understood that both dispensing stations 24 have identical configurations and operate in the same fashion.

Bar code reader 150 is secured to packet top collector 122 and is aimed such that bar code 152 positioned on the top portion of the seed packet that will be removed by die cutter 48 can be scanned by bar code reader 150. Bar code reader 150 is communicatively connected to controller 42 which is capable of storing information read by bar code reader 150 in memory as a text file, which can later be printed or exported to the memory of another electronic device. Each seed packet can include bar coded information indicative of the type and number of seeds contained in the packet. Referring to FIG. 1, Global Positioning System (GPS) antenna 154 can be secured to tractor 22. In alternative embodiments, GPS antenna 154 can be secured to research plot planter 20. GPS antenna is communicatively connected to controller 42 and operable in cooperation with a Global Positioning System to continually determine the position of planter 20 as a function of time. Controller 42 is therefore capable of storing a correlation of time, position and seeds planted so that an accurate plot map may be generated. In this way, an automatic process is utilized to record the seeds planted in a research plot.

FIGS. 6-10 and 12-14 illustrate the cyclical process implemented by automated seed packet opening and dispensing stations 24 to automatically open a seed packet and dispense the contents of the same for planting in a research plot. Each cycle of automated seed packet opening and dispensing stations 24 begins with first aperture 108 positioned in the 12 o'clock position, with this position verified by proximity sensor 148, as described above. With first aperture maintaining the 12 o'clock position, first packet 130 is inserted through opening 46 in funnel 44 and thereafter traverses packet chute 50 (FIG. 5) in die cutter 48 and opening 140 (FIG. 5) in housing plate 54 to be supported by first packet receptacle 58 of packet receiver 56, as illustrated in FIG. 6. In this position, bar code 152 can be read by bar code reader, as illustrated in FIG. 12 and described above. Although operation of a single dispensing station 24 is described, in use, both dispensing stations 24 will be synchronized and an operator will simultaneously position packets in both dispensing stations 24. To synchronize a plurality of dispensing stations 24 (while two are illustrated in the exemplary embodiment, more than two may be utilized controller 42 does not initiate a cycle of the dispensing stations, until the proximity sensors 148 of all of the dispensing stations signal to the controller that one of first aperture 108 and second aperture 110 of each packet receiver 56 maintains the 12 o'clock position. In the event that the proximity sensors of all of the dispensing stations do not signal positioning of one of first aperture and second aperture 110 of each packet receiver in the 12 o'clock position within a predetermined time period, controller 42 may signal a jam. Once an operator positions first packet 130 as illustrated in FIG. 6, die cutter 48 can be actuated to shear top 132 from first packet 130. FIG. 12 illustrates a step of inserting first packet 130 as described hereinabove. In an exemplary embodiment, first packet 130 is a paper pouch configured to hold dry seeds. In alternative embodiments, first packet 130 may comprise a package, or container adapted to hold seeds and/or liquid material to be planted in the ground.

FIG. 13 illustrates actuation of reciprocating die 112 to shear top 132 from first packet 130. Die cutter 48 is illustrated in detail in FIG. 11. As described above, reciprocating die 112 acts as a shear as it passes over shear bar 120. Specifically, reciprocating die 112 is sized and spaced relative to shear bar 120 such that actuation of reciprocating die 112, with first packet 130 positioned with a portion thereof occupying window 118 of die cutter 48, will press the top portion of first packet 130 against shear bar 120. Reciprocating die 112 is sized and positioned relative to shear bar 120 such that reciprocation of reciprocating die 112 into the position illustrated in FIG. 13 will press the top portion first packet 130 against shear bar and cause shearing of top 132 therefrom.

After top 132 is removed from first packet 130, packet receiver 56, which, as seen in FIGS. 13 and 14 comprises a generally vertically oriented turntable, with end wall 62, first packet support side walls 64 and second packet support side walls 66 axially extending therefrom, can be rotated from the position illustrated in FIGS. 6, 7 and 13 in which first packet receptacle 58 is oriented as an upward opening U-shape (with first aperture 108 maintaining the 12 o'clock position) into the position illustrated in FIGS. 9 and 14 in which first packet receptacle 58 is oriented as a downward opening U-shape (with first aperture 108 maintaining the 6 o'clock position and second aperture 110 maintaining the 12 o'clock position). Packet receiver 56 is "generally vertically" oriented in that any radius of the back plate of packet receiver 56 (from which end wall 62, first packet support side walls 64 and second packet support side walls 66 axially extend) is oriented vertically or within a few degrees of vertical relative to the coordinate system of research plot planter 20. In the exemplary embodiment illustrated in the figures, motor 70 is energized to actuate drive shaft 68 to rotate packet receiver 56, as will be described in further detail below in conjunction with the automated cyclic operation of automated seed packet opening and dispensing stations 24.

As packet receiver 56 is rotated from the position illustrated, e.g., in FIG. 6, first aperture 108 through packet receiver 56 is placed in fluid communication with arcuate negative pressure channel 82. As described above, arcuate negative pressure channel 82 is in fluid communication with vacuum source 94, When first aperture 108 through packet receiver 56 is placed in fluid communication with arcuate negative pressure channel 82, vacuum source 94 applies negative pressure to first packet 130 to pull first packet 130 toward packet receiver 56 and hold first packet 130 against packet receiver 56 against the force of gravity such that packet receiver 56 can be rotated into the inverted position illustrated, e.g., in FIG. 9 so that seeds 36 can be dispensed from first packet 130 by the force of gravity, as illustrated in FIG. 9. Negative pressure will encounter a packet in the packet receiver during at least part of the step of moving a packet from the opening position to the dispensing position. To further facilitate dispensing of seeds 36 from first packet 130, motor 70 can oscillate packet receiver 56 (i.e., move packet receiver 56 to/and fro through a small angle of rotation) to facilitate "shaking" seeds 36 from first packet 130. Oscillation of packet receiver 56 (and, consequently, first packet 130 secured thereagainst by vacuum source 94) prevents friction from holding seeds 36 in first packet 130 against the force of gravity. Vacuum source 94 holds first packet 130 against packet receiver 56 with sufficient force so that packet receiver 56 will not fall from packet receiver 56 under the force of gravity during the dispensing step.

Figure 10:
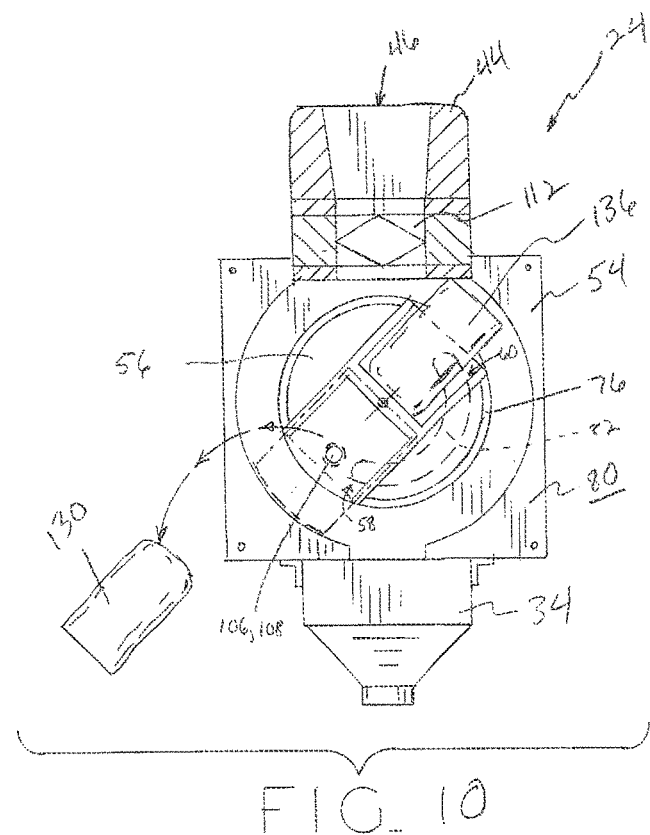
FIG. 10 is a partial sectional, front elevational view of the seed packet opening and dispensing device of FIGS. 3-5, illustrating discharge of the first seed packet therefrom.

After seeds 36 are dispensed from first packet 130 (through opening 142 in housing plate 54, see FIG. 5), packet receiver 56 is rotated until first aperture 108 through packet receiver 56 is aligned with positive pressure port 106, as illustrated in FIG. 10. As discussed above, positive pressure port 106 is in fluid communication with compressor 102. In an exemplary embodiment, compressor 102. continuously supplies positive pressure to positive pressure port 106. In alternative embodiments, pressure to positive pressure port 106 may be regulated by a valve such as a solenoid actuated valve controlled by controller 42 such that positive pressure is only supplied to positive pressure port 106 when one of first aperture 108 and second aperture 110 through packet receiver 56 is aligned with positive pressure port 106. Use of controller 42 to implement a continuous, cyclical process of automatically opening a seed packet and dispensing the contents of the same is further described hereinbelow. With first aperture 108 aligned with positive pressure port 106, actuation of packet receiver 56 by motor 70 may cease momentarily such that packet receiver 56 dwells in the position illustrated in FIG. 10 for a period of time. With first aperture 108 aligned with positive pressure port 106, positive pressure from compressor 102 will eject first packet 130 from first packet receptacle 58, as illustrated in FIG. 10. FIG. 10 illustrates automated seed packet opening and dispensing station 24 with front plate 78 (FIG. 5) removed therefrom to better illustrate components of automated seed packet opening and dispensing station 24.

Referring to FIG. 3, front plate 78 includes window 134. With packet receiver 56 positioned as illustrated in FIG. 10, first packet receptacle 58 is aligned with window 134, such that first packet 130 is discharged from automated seed packet opening and dispensing station 24 through window 134. Referring to FIG. 1 and 2, waste containers 32 are positioned adjacent to and beneath each automated seed packet opening and dispensing station 24 to receive packets discharged from automated seed packet opening and dispensing stations 24, as described above. After first packet 130 is ejected through window 134 in front plate 78, packet receiver 56 is rotated to the position illustrated, e.g., in FIGS. 6 and 7 to begin a subsequent cycle of automated seed packet opening and dispensing station 24.

Second packet 136 is introduced into automated seed packet opening and dispensing station 24 during the above described cycle associated with first packet 130. Specifically, second packet 136 is positioned through opening 46 in funnel 44 and received in second packet receptacle 60 in the same way that first packet 130 was introduced to and supported by first packet receptacle 58, as described above. Specifically, second packet 136 is introduced into automated seed packet opening and dispensing station 24 just after first packet receptacle 58 achieves the position illustrated in FIGS. 9 and 14, i.e., a position in which first packet receptacle 58 forms a downward opening U-shape and, consequently, second packet receptacle 60 forms an upward opening U-shape. In the automated cycle of automated seed packet opening and dispensing station 24, second packet 136 is positioned as illustrated in FIG. 9 and reciprocating die 112 is actuated to shear the top off second packet 136 prior to oscillation of packet receiver 56 during a step of dispensing seeds 36 from first packet 130. Note that the step of oscillation is optional in the dispensing step and that seeds 36 may simply he dispensed from first packet 130 under force of gravity. Second packet 136 then undergoes the same process and steps described above with respect to first packet 130 until second packet 136 is discharged from automated seed packet opening and dispensing station 24 as illustrated with respect to first packet 130 and described above with reference to FIG. 10.

As illustrated in FIG. 2, controller 42 is communicatively connected to vacuum source 94, compressors 102, 128, motor 70, air cylinders 96 and die cutters 48 (e.g., with a communication line running along air lines 138). Controller 42 is further communicatively connected to bar code reader 150 and proximity sensor 148 (FIG. 2). In the cycle described above, controller 42 can be used to continuously and cyclically control automated seed packet opening and dispensing stations 24. Specifically, controller 42 may execute software instructions to cyclically operate automated seed packet opening and dispensing stations 24 as described herein.

Controller 42 will continuously and cyclically operate automated seed packet opening and dispensing stations 24 in accordance with a set of pre-loaded software instructions which cause controller 4 to actuate components of automated seed packet opening and dispensing stations 24 as described below (and above). As described above, each cycle begins with first packet receptacle 58 forming an upwardly open U-shape (with first aperture 108 maintaining a 12 o'clock position, as sensed by proximity sensor 148) and ends after packet receiver 56 completes a 360° rotation (clockwise, with reference to FIGS. 6-10). For ease of description, the document refers to specific first and second "apertures" (108 and 110) and first and second "packet receptacles" (58 and 60). However, packet receiver 56 is symmetric so these designations are interchangeable. As described in detail throughout this document, the 360° rotation of a turntable in the form of packet receiver 56 can include cumulative rotations totaling more than 360° of movement in the event that packet receiver 56 is oscillated to facilitate dispensing seeds from a packet.

With packet receiver 56 positioned as illustrated in FIG. 6 (and proximity sensor 148 signaling one of first aperture 108 and second aperture 110 maintaining the 12 o'clock position), controller 42 will deactivate motor 70 such that packet receiver 56 dwells in this "top dead center" position to allow first packet 130 to be inserted by an operator. During this pre-determined dwell period at top dead center, bar code reader 150 will read bar code 152 and controller 42 will thereafter actuate die cutter 48 to reciprocate reciprocating die 112 from the position illustrated in FIG. 14 to the position illustrated in FIG. 13 and back again to the position illustrated in FIG. 14.

After actuation of die cutter 48, controller 42 will energize motor 70 to oscillate packet receiver 56, i.e., to rapidly rotate packet receiver 56 through small, alternating clockwise and counter clockwise arcs. Such oscillation will facilitate dispensing of seeds from a packet contained in second packet receptacle 60. After oscillating packet receiver 56, controller 42 energizes motor 70 to rotate packet receiver 56 until second aperture 110 is aligned with positive pressure port 106. In this position, controller 42 signals a dwell period in which packet receiver 56 is held stationary by motor 70. In the event that a valve system is utilized to selectively allow communication of pressurized air from compressor 102 through positive pressure port 106, controller 42 signals opening of such valve so that pressurized air from compressor 102 is conveyed through positive pressure port 106 and second aperture 110 during the dwell period to discharge a packet occupying second packet receptacle 60.

Subsequently, controller 42 energizes motor 70 to rotate packet receiver 56 to a "bottom dead center" position in which first packet receptacle 58 forms a downward opening U-shape. During this rotation of packet receiver 56, first aperture 108 through packet receiver 56 is placed in fluid communication with arcuate negative pressure channel 82. Should a valve system be utilized, such that negative pressure from vacuum source 94 is only communicated through arcuate negative pressure channel 82 when one of first aperture 108 and second aperture 110 is in fluid communication with arcuate negative pressure channel 82, then controller 42 will initiate opening of such valves when either first aperture 108 or second aperture 110 is positioned to be in fluid communication with arcuate negative pressure channel 82. If valves are used in any of the positive or negative pressure lines utilized in the exemplifications described herein, such valves can be, e.g., solenoid valves. In a position in which packet receiver 56 is in the "bottom dead center" position with first packet receptacle 58 forming a downward opening U-shape, as illustrated, e.g., in FIGS. 9 and 14, controller 42 repeats the process described above with respect to first packet receptacle 58, but with second packet receptacle 60. In this way, each complete cycle can be broken into two half cycles.

In the second half cycle, packet receiver 56 dwells in the position illustrated in FIG. 9, with second packet receptacle 60 forming an upward opening U-shape (and second aperture 110 maintaining the 12 o'clock position). If multiple automated seed packet opening and dispensing stations 24 are utilized, controller 42 will wait until all of the packet receivers 56 are positioned with second aperture 110 maintaining the 12 o'clock position to initiate the half cycle (starting with the dwell period). During the dwell period, controller 42 deactivates motor 70 so that packet receiver 56 remains stationary. During this pre-determined dwell period, controller 42 will activate bar code reader 150 to read the bar code on an inserted package and thereafter to actuate die cutter 48 to reciprocate reciprocating die 112 from the position illustrated in FIG. 14 to the position illustrated in FIG. 13 and back again to the position illustrated in FIG. 14. After actuation of die cutter 48, controller 42 will energize motor 70 to oscillate packet receiver 56, i.e., to rapidly rotate packet receiver 56 through small, alternating clockwise and counter clockwise arcs to facilitate dispensing of seeds contained in a packet supported by first packet receptacle 58.

After oscillating packet receiver 56, controller 42 energizes motor 70 to rotate packet receiver 56 until first aperture 108 is aligned with positive pressure port 106. In this position, controller 42 signals a dwell period in which packet receiver 56 is held stationary by motor 70. In the event a valve system is utilized to selectively allow communication of pressurized air from compressor 102 through positive pressure port 106, controller 42 signals opening of such valve so that pressurized air from compressor 102 is conveyed through positive pressure port 106 and first aperture 108 to discharge a packet occupying seed packet receptacle 58.

Subsequently, controller 42 energizes motor 70 to rotate packet receiver 56 to the "top dead center" position referenced above, i.e., to a position in which first packet receptacle 58 forms an upward opening U-shape and second packet receptacle 60 forms a downward opening U-shape. During this rotation of packet receiver 56, second aperture 110 through packet receiver 56 is placed in fluid communication with arcuate negative pressure channel 82. Should a valve system be utilized, such that negative pressure from vacuum source 94 is only communicated through arcuate negative pressure channel 82 when one of first aperture 108 and second aperture 110 is in fluid communication with arcuate negative pressure channel 82, then controller 42 will initiate opening of such valves when either first aperture 108 or second aperture 110 is positioned to be in fluid communication with arcuate negative pressure channel 82.

Figure 15:
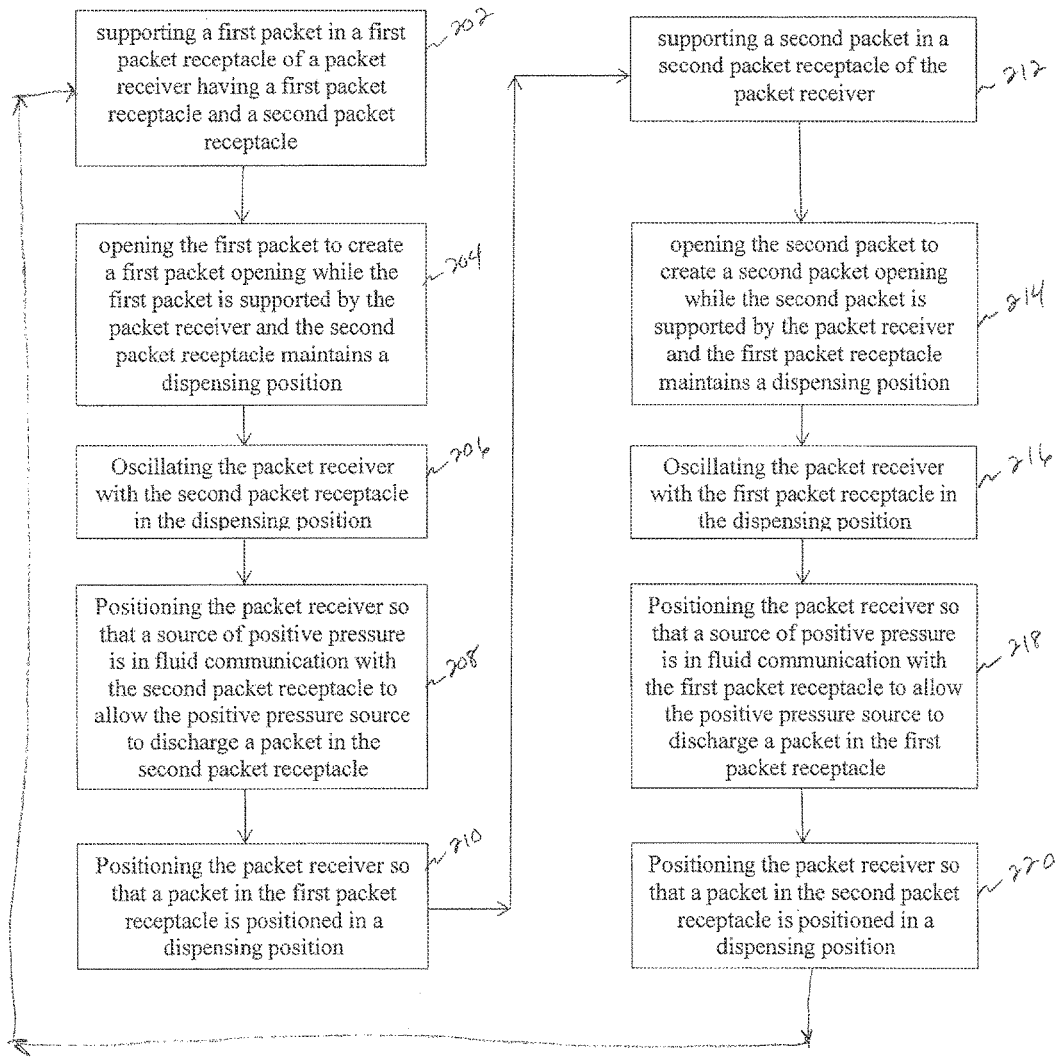
FIG. 15 illustrates an exemplary method for automated opening and dispensing of seed from a container.

FIG. 15 illustrates method 200 in accordance with the present disclosure. FIG. 15 illustrates a first-half cycle in accordance with the method of the present disclosure in its left column and illustrates a second-half cycle in its right column. As described above, method 200 is implemented on research plot planter 20, as described in detail above. The method, in accordance with an exemplification of the present disclosure begins as indicated in step 202 by supporting a first packet in a first packet receptacle of a packet receiver having a first packet receptacle and a second packet receptacle. During step 202, a bar code on the first packet may be read. The method next progresses to step 204 in which the first packet is opened to create a first-packet opening while the first packet is supported by the packet receiver and the second packet receptacle maintains a dispensing position.

The method next progresses to step 206 in which the packet receiver is oscillated with the second packet receptacle in the dispensing position. Subsequently, the method progresses to step 208 in which the packet receiver is positioned so that a source of positive pressure is in fluid communication with the second packet receptacle to allow the positive pressure source to discharge a packet in the second packet receptacle. The method next progresses to step 210 in which the packet receiver is positioned so that a packet in the first packet receptacle is positioned in a dispensing position. At this point, the first-half cycle is completed.

The second-half cycle begins with step 212 in which a second packet is supported in the second packet receptacle of the packet receiver. During step 212, a bar code on the second packet may be read. Subsequently, the method progresses to step 214 in which the second packet is opened to create a second packet opening while the second packet is supported by the packet receiver and the first packet receptacle maintains a dispensing position. The method then progresses to step 216 in which the packet receiver is oscillated with the first packet receptacle in the dispensing position. The method then progresses to step 218 in which the packet receiver is positioned so that a source of positive pressure is in fluid communication with the first packet receptacle to allow the positive pressure source to discharge a packet in the first packet receptacle. Finally, in step 220, the packet receiver is positioned so that a packet in the second packet receptacle is positioned in a dispensing position. Cyclical method 200 then returns to step 202 and the cycle repeats.

During steps 206 and 216, the second packet receptacle and first packet receptacle, respectively maintain a "dispensing position" that is, in an exemplary embodiment of the present disclosure, within 10° of rotation either clockwise or counter clockwise from a position in which first packet support side walls and second packet support side walls are vertically oriented. In exemplifications of method 200, steps 210 and 220 include positioning the packet receivers so that a source of negative pressure is in fluid communication with the first packet receptacle and the second packet receptacle, respectively. Negative pressure will typically be placed in fluid communication with a packet receptacle at any time before packet discharge during which gravity could act on a packet to pull the packet from the packet receptacle.

While this invention has been described as having exemplary designs, the present invention may be further modified with the spirit and scope of this disclosure. Further, this application is intended to cover such departures from the present disclosure as come within known or customary practice in the art to which this invention pertains.

What is claimed is:

1. An automatic opener and dispenser, comprising:
   a packet receiver comprising a first packet receptacle and a second packet receptacle, said packet receiver moveably supported by a support, said packet receiver sized, shaped and configured to receive and support two packets simultaneously in the first packet receptacle and the second packet receptacle;
   a packet opener supported by said support and positioned relative to said packet receiver to allow said packet opener to selectively open a packet supported by one of said first packet receptacle and said second packet receptacle;
   an automatic drive supported by said support and operably connected to said packet receiver, said automatic drive operable to actuate said packet receiver through a cyclical movement comprising a plurality of cycles, each cycle of the plurality of cycles including:
   a first packet opening/second packet dispensing stage corresponding to a position of the packet receiver in which the first packet receptacle is positioned such that said packet opener is operable to open a packet supported in said first packet receptacle and said second packet receptacle is simultaneously positioned such that an opened packet supported in said second packet receptacle is positioned such that a content of the opened packet is dispensed, and
   a first packet dispensing/second packet opening stage corresponding to a position of the packet receiver in which the first packet receptacle is positioned such that an opened packet supported in said first packet receptacle is positioned such that a content of the opened packet is dispensed and said second packet receptacle is simultaneously positioned such that said packet opener is operable to open a packet supported in said second packet receptacle,
   said packet receiver sized, shaped and configured to simultaneously support packets in both said first packet receptacle and said second packet receptacle in both said first packet opening/second packet dispensing stage and said first packet dispensing/second packet opening stage.

2. The automatic packet opener and dispenser of claim 1, wherein said packet opener comprises a shear moveably supported relative to said support and positioned to be moveable to shear the packet supported by one of said first packet receptacle and said second packet receptacle.

3. The automatic packet opener and dispenser of claim 2, wherein said shear comprises a die cutter.

4. The automatic packet opener and dispenser of claim 1, wherein said packet receiver comprises a turntable rotatably supported by said support in a generally vertical orientation and wherein each cycle of said plurality of cycles includes a complete 360 degree rotation of said turntable.

5. The automatic packet opener and dispenser of claim 4, wherein said first packet receptacle of said packet receiver comprises a first packet support and said second packet receptacle of said packet receiver comprises an opposing second packet support, said first packet support comprising an end wall and a pair of spaced first packet support sidewalls extending along a first direction from said end wall, said second packet support comprising the end wall and a pair of spaced second packet support sidewalls extending along a second direction from said end wall, said first direction opposite said second direction, whereby, when said first packet support is oriented as an upward opening U-shape, said second packet support is oriented as a downward opening U-shape.

6. The automatic packet opener and dispenser of claim 1, further comprising a negative pressure source selectively in fluid communication with one of said first packet receptacle and said second packet receptacle to hold a packet therein against the force of gravity.

7. The automatic packet opener and dispenser of claim 6, wherein said packet receiver defines a first aperture in fluid communication with said first packet receptacle and a second aperture in fluid communication with said second packet receptacle, and wherein said support defines a negative pressure channel in fluid communication with said negative pressure source, said negative pressure channel selectively in fluid communication separately with each of said first aperture and said second aperture during a portion of each cycle of said plurality of cycles.

8. The automatic packet opener and dispenser of claim 7, wherein said packet receiver comprises a turntable rotatably supported by said support in a generally vertical orientation and wherein each cycle of said plurality of cycles includes a complete 360 degree rotation of said turntable, and wherein said negative pressure channel in said support comprises an arcuate negative pressure channel, said arcuate negative pressure channel sized and arranged so that said negative pressure channel is in fluid communication separately with each of said first aperture and said second aperture through less than the complete 360 degree rotation of said turntable during each of said plurality of cycles.

9. The automatic packet opener and dispenser of claim 1, further comprising a positive pressure source selectively in fluid communication with one of said first packet receptacle and said second packet receptacle to discharge a packet therein from said packet receiver, said positive pressure source in fluid communication with one of said first packet receptacle and said second packet receptacle after said one of said first packet receptacle and said second packet receptacle is positioned such that an opened packet supported in said one of said first packet receptacle and said second packet receptacle is positioned such that a content of the opened packet supported in said one of said first packet receptacle and said second packet receptacle is dispensed.

10. The automatic packet opener and dispenser of claim 7, further comprising a positive pressure source selectively in fluid communication with one of said first packet receptacle and said second packet receptacle to discharge a packet therein from said packet receiver, said positive pressure source in fluid communication with one of said first packet receptacle and said second packet receptacle after said one of said first packet receptacle and said second packet receptacle is positioned such that an opened packet supported in said one of said first packet receptacle and said second packet receptacle is positioned such that a content of the opened packet supported in said one of said first packet receptacle and said second packet receptacle is dispensed, wherein said support defines a positive pressure aperture in fluid communication with said positive pressure source, said positive pressure aperture selectively in fluid communication separately with each of said first aperture and said second aperture to selectively and separately place said positive pressure source in fluid communication with each of said first packet receptacle and said second packet receptacle during each cycle of the plurality of cycles.

11. The automatic packet opener and dispenser of claim 1, wherein said automatic drive comprises a controller operable to actuate said automatic drive to actuate said packet receiver through the cyclical movement.

12. The automatic packet opener and dispenser of claim 11, wherein said controller is communicatively connected to said packet opener and operable to actuate said packet opener to open a packet in said first packet receptacle in the first packet opening/second packet dispensing stage of each cycle of the plurality of cycles and thereafter to actuate said automatic drive to actuate said packet receiver to said first packet dispensing/second packet opening stage and thereafter to actuate said packet opener to open a packet in said second packet receptacle, and to repeat these steps to create the cyclical movement.

13. The automatic packet opener and dispenser of claim 12, wherein said controller is operable to actuate said automatic drive to oscillate said packet receiver after each actuation of the packet opener to open a packet, but before actuating said packet receiver between said first packet opening/second packet dispensing stage and said first packet dispensing/second packet opening stage or vice versa.

14. The automatic packet opener and dispenser of claim 9, wherein said automatic drive comprises a controller operable to actuate said automatic drive to actuate said packet receiver through the cyclical movement and wherein said controller is communicatively connected to said packet opener and operable to actuate said packet opener to open a packet in said first packet receptacle in the first packet opening/second packet dispensing stage of each cycle of the plurality of cycles and thereafter to actuate said automatic drive to oscillate said packet receiver and thereafter to actuate said automatic drive to position said second packet receptacle so that said positive pressure source is in fluid communication with said second packet receptacle through a second aperture in the packet receiver and to dwell for a predetermined time period with said positive pressure source in fluid communication with said second packet receptacle to allow said positive pressure source to discharge a packet in said second packet receptacle and thereafter to actuate said automatic drive to actuate said packet receiver to said first packet dispensing/second packet opening stage and thereafter to actuate said packet opener to open a packet in said second packet receptacle, and thereafter to actuate said automatic drive to oscillate said packet receiver and thereafter to actuate said automatic drive to position said first packet receptacle so that said positive pressure source is in fluid communication with said first packet receptacle through a first aperture in the packet receiver and to dwell for the predetermined time period with said positive pressure source in fluid communication with said first packet receptacle to allow said positive pressure source to discharge a packet in said first packet receptacle and to continuously repeat these steps to create the cyclical movement.

15. The automatic packet opener and dispenser of claim 1, wherein said automatic drive comprises an electric motor.

16. The automatic packet opener and dispenser of claim 15, wherein said electric motor comprises a stepper motor.

17. A method of opening and dispensing a content of a packet, comprising:
  supporting a first packet with a packet receiver;
  opening the first packet to create a first packet opening while the first packet is supported by the packet receiver;
  moving the first packet to a dispensing position while the first packet is supported by the packet receiver;
  dispensing a content of the first packet through the first packet opening while first packet is supported by the packet receiver;
  supporting a second packet with the packet receiver during said step of dispensing the content of the first packet through the first packet opening, whereby the second packet and the first packet are simultaneously supported by the packet receiver; and
  during said step of supporting a second packet with the packet receiver and during said step of dispensing the content of the first packet through the first packet opening, opening the second packet to create a second packet opening, whereby said second packet is opened while the content of the first packet is dispensed.

18. The method of opening, and dispensing a content of a packet of claim 17, wherein said step of dispensing the content of the first packet through the first packet opening comprises the step of positioning the first packet opening so that gravity will act on the content of the first packet to pull the content of the first packet out of the first packet through the opening.

19. The method of opening and dispensing a content of a packet of claim 18, wherein said step of dispensing the content of the first packet further comprises the step of oscillating the first packet while the first packet opening is positioned so that gravity will act on the content of the first packet to pull the content of the first packet out of the first packet through the opening and while the first packet is supported by the packet receiver.

20. The method of opening and dispensing a content of a packet of claim 17, wherein said step of supporting the first packet with the packet receiver comprises the step of holding the first packet against the packet receiver during said step of moving the first packet to a dispensing position.

21. The method of opening and dispensing a content of a packet of claim 20, wherein said step of holding the first packet against the packet receiver during said step of moving the first packet to a dispensing position comprises applying a negative pressure to the first packet through an aperture in the packet receiver during said step of moving the first packet to a dispensing position, whereby the negative pressure holds the first packet against the force of gravity.

22. The method of opening and dispensing a content of a packet of claim 17, further comprising the step of discharging the first packet from the packet receiver after the step of dispensing the content of the first packet through the first packet opening.

23. The method of opening and dispensing a content of a packet of claim 22, wherein said step of discharging the first packet from the packet receiver comprises applying a positive pressure to the first packet through an aperture in the packet receiver, whereby the positive pressure forces the first packet out of the packet receiver.

24. method of opening and dispensing a content of a packet of claim 17, further comprising the step of holding the first packet against the packet receiver with negative pressure during at least part of the step of moving the first packet to a dispensing position.

25. The method of opening and dispensing a content of a packet of claim 24, further comprising the step of applying a positive pressure to the first packet after the dispensing step to discharge the first packet from the packet receiver.

26. method of opening and dispensing a content of a packet of claim 17, wherein said step of opening the first packet to create a first packet opening comprises shearing an end of the first packet to create the first packet opening.

27. The method of opening and dispensing a content of a packet of claim 17, wherein said step of shearing an end of the first packet to create the first packet opening comprises the step of shearing the end of the first packet with a die cutter to create the first packet opening.

28. The method of opening and dispensing a content of a packet of claim 17, wherein said packet receiver comprises a turntable rotatably supported by a support in a generally vertical orientation and wherein said step of moving the first packet to a dispensing position while the first packet is supported by the packet receiver comprises the step of rotating said turntable.

29. The method of opening and dispensing a content of a packet of claim 28, wherein the packet receiver comprises a first packet receptacle comprising a first packet support comprising an end wall and a pair of spaced first packet support sidewalls extending along a first direction from said end wall, and the packet receiver further comprises a second packet receptacle comprising a second packet support comprising the end wall and a pair of spaced second packet support sidewalls extending along a second direction from the end wall, the first direction opposite the second direction, whereby, when the first packet support is oriented as an upward opening U-shape, said second packet support is oriented as a downward opening U-shape, and wherein said step of moving the first packet to a dispensing position while the first packet is supported by the packet receiver comprises rotating the turntable through 180 degrees.

30. The method of opening and dispensing a content of a packet of claim 17, wherein said step of moving the first packet to a dispensing position comprises the step of actuating an electric motor to move the packet receiver to the dispensing position.

31. A planter for planting a first plurality of seeds contained in a first container and a second plurality of seeds contained in a second container, the planter comprising:
a frame;
at least one seed metering device supported by the frame;
a seed dispensing device supported by the frame, the seed dispensing device including a first stage whereat the first container is automatically opened and a second stage whereat the first plurality of seeds are dispensed from the first container; and
a controller operably coupled to the seed dispensing device, the controller controlling the opening of the first container when the first container is in the first stage and the controller controlling a movement of the first container to the second stage, the second container being automatically opened prior to the first container exiting the second stage.

32. The planter of claim 31, wherein the seed dispensing device includes a third stage whereat the first container is discharged from the seed dispensing device.

33. The planter of claim 31, wherein the seed dispensing device comprises:
a packet receiver comprising a first packet receptacle and a second packet receptacle, the packet receiver movably supported relative to the frame, the packet receiver sized, shaped and configured to receive and support two packets simultaneously in the first packet receptacle and the second packet receptacle; and
a packet opener supported by the frame and positioned relative to the packet receiver to automatically open the first container at the first stage of the seed dispensing device the packet opener communicatively connected to the controller, whereby the controller actuates the packet opener to open the first container at the first stage.

34. The planter of claim 33, wherein the packet opener comprises a shear movably supported relative to the frame and positioned to be moveable to shear the first container in the first stage.

35. The planter of claim 33, wherein the packet receiver comprises a turntable rotatably supported relative to the frame in a generally vertical orientation, and wherein the first packet receptacle of the packet receiver comprises a first packet support and the second packet receptacle of the packet receiver comprises an opposing second packet support, the first packet support comprising an end wall and a pair of spaced first packet support sidewalls extending along a first direction from the end wall, the second packet support comprising the end wall and a pair of spaced second packet support sidewalls extending along a second direction from the end wall, the first direction opposite the second direction, whereby, at the first stage, the first packet support is oriented as an upward opening U-shape and the second packet support is oriented as a downward opening U-shape.

36. The planter of claim 31, further comprising a negative pressure source selectively in fluid communication with the first container in the second stage whereat the first plurality of seeds are dispensed from the first container.

37. The planter of claim 32, further comprising a positive pressure source selectively in fluid communication with the first container in the third stage whereat the first container is discharged from the seed dispensing device.

38. The planter of claim 31, wherein during the second stage, the controller oscillates the seed dispensing device.

39. The planter of claim 31, further comprising an electric motor connected for driving the seed dispensing device, the electric motor communicatively connected to the controller, whereby the controller is operable to control an actuation of the electric motor.

* * * * *